Oct. 21, 1941.  P. S. ROLLER  2,259,491
APPARATUS FOR MEASURING PLASTICITY
Filed Jan. 9, 1939
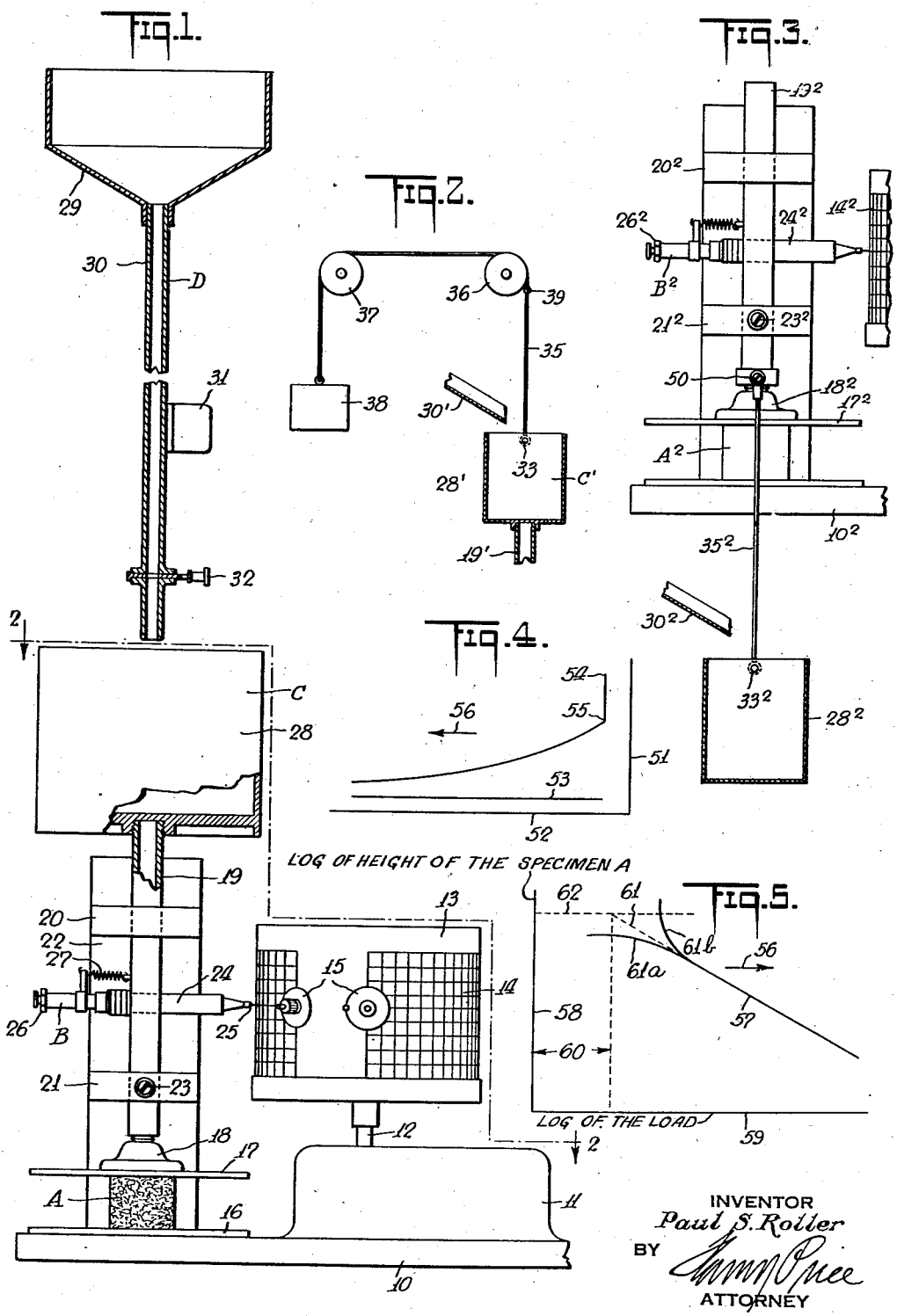
INVENTOR
Paul S. Roller
BY
ATTORNEY Patented Oct. 21, 1941

2,259,491

UNITED STATES PATENT OFFICE 2,259,491

APPARATUS FOR MEASURING PLASTICITY

Paul S. Roller, Berwyn, Md.

Application January 9, 1939, Serial No. 249,892

2 Claims. (Cl. 265—2)

The present invention relates to an apparatus for determining the plasticity of various plastic materials composed of two phases, one of which is dispersed in the other, such as for example creams, greases, shortenings, clays, lime putties, mortars and other similar disperse systems.

There has been some confusion in respect to plastic materials as of the character above described in respect to what exactly is considered to be the plastic properties of the materials.

A great deal of uncertainty resulted from the fact that the yield properties of the material were confused with the plastic properties and both properties were confused with other factors, such as consistency, softness, compressive strength, workability and so forth.

Generally where it was attempted to measure the plasticity of various plastic materials, the results which were obtained did not truly represent the plastic properties of the material, but rather represented the combined plastic and other properties, with the result that accurate determinations of value in scientific investigation could not be obtained and with a further result that it was not readily possible to reproduce the results and there were many varying factors which prevented accurate classification of the materials and determination of their quality and utility.

Most of the testing methods used up to the present time have been largely empirical in nature and they have not taken into consideration the variable fundamentals that govern the plasticity of the material being tested, regardless of other properties, such as consistency, yield value, softness and so forth, and the results which were obtained by such testing methods were usually controlled by such other factors as well as by the plasticity characteristics.

As for example, in determining plasticity by penetration of a rod or needle into the plastic mass, the penetration varies with the amount of liquid in the system which therefore masks the inherent property of plasticity and prevents accurate determination of the plasticity.

Moreover the force exerted by the descending needle or rod is poorly defined and varies with the penetration of such needle or rod and further gives rise to different results.

Nor has it been found possible accurately to measure the plasticity by squeezing a plastic mass under relatively large defined loads by measurement of the time rate deformation, or the amount of particular deformation after a given time.

In this last procedure the time rate measurement is considered to be wrong in principle, while the particular deformation after a time is found to be arbitrary and inadequate to give a correct picture of the plasticity characteristics.

In addition, it has not been found possible to determine the plasticity characteristics in accurate fashion by the slump of a plastic mass determined after a series or predetermined number of vibrations or bumps.

Indirect determinations, of course, as by determining the compressive or tensile strength, or by the percentage of liquid which is necessary to reach a so-called consistency, or of the adsorption of water vapor or dyes or so forth by the solid phase, also do not give an accurate picture of the plasticity characteristics of the products to be measured as above stated.

It is among the objects of the present invention to provide an improved apparatus for determining the plasticity characteristics of a plastic material, as for example, creams, greases, shortenings, plastic waxes and fats, clay pastes, lime putties, mortars and so forth, which will give an accurate picture of the plastic characteristics of the product without fortuitous variation due to interference of other factors, such as consistency, water content, softness, yield, rate of slump and so forth.

Another object is to provide a means for giving a direct determination of the plasticity characteristics of a product without the necessity of resorting to indirect determinations, such as those resulting from slump, consistency, adsorption of water vapors, dyes and so forth.

Other and further objects and advantages will also appear from the more detailed description given below, it being understood, however, that this more detailed description is given by way of illustration and explanation only and not by way of limitation, since various changes therein may be made by those skilled in the art without departing from the scope and sphere of the present invention.

It has now been found that the plasticity characteristics may be accurately and directly determined by subjecting a plastic mass to a gradually increasing pressure which will be applied to the entire cross sectional area of the mass, with resultant measurements of the deformation of the mass with increasing pressure.

It has further been found that the plasticity may accurately be measured by the following formula:

$$K = \frac{\log p/p_0}{\log h_0/h}$$

where $p$ is the applied pressure, $h$ is the height of the specimen corresponding to $p$, $h_0$ is the initial height, $p_0$ is a constant which may easily be determined to be the yield value, or pressure just necessary to cause plastic flow to begin and $K$ is a constant, characteristic of the plasticity.

The constant $K$ may be regarded as the coefficient of renitence, i. e. a measure of the ability of the plastic body to resist continued deformation and hence the inverse measure of plasticity. To determine the constants K and $p_0$, it is necessary to determine the variables $p$ and $h$.

By the above formula constants K and $p_0$, may be determined by a plot of log $p$ against log $h$. This plot gives a straight line, the slope and intercept of which give K and log $p_0$ respectively. However, there are usually certain deviations from the straight line at the smaller pressures due to the weight of the specimen, forces applied in molding, and initial dead weight of the apparatus and these values at the smaller pressures may be disregarded in determining the constants.

It is necessary first to determine relationship between increasing pressure and decreasing height and this may be done by an apparatus as shown upon the drawing.

Referring to the drawing which shows an apparatus for determining the plasticity, Fig. 1 is a diagrammatic showing of the apparatus in side view and in partial section, Fig. 2 is a diagrammatic view illustrating an alternative construction in which the device is provided with a counterbalance, Fig. 3 also diagrammatically illustrates an alternative construction in which the loading arrangement is positioned below the specimen, Fig. 4 diagrammatically illustrates the type of curve which is obtained as a result of the operation of the apparatus of Figs. 1 to 3, said curve being obtained upon the chart, and Fig. 5 illustrates a typical logarithmic plot obtained from the results obtained in Fig. 4.

In the device as shown in Fig. 1, there is provided a specimen A, an arrangement B for recording and determining the height of the specimen, a load transmission system C and a means for continuously adding load D.

Referring to Fig. 1, the base 10 carries a motor and gear casing 11 which may contain a synchronous motor connected with gearing to drive the shaft 12.

Attached to the shaft 12 is the drum 13 carrying the chart 14 which is held in position by clamps 15. Upon the base 10 is positioned the lower plate or platten 16 upon which the specimen A is placed.

The specimen A, for example, may be plastic cup grease, cream, ball clay, lime putty, cement mortar, masonry mortar, plastic kaolin, and it preferably is of cylindrical shape and is made up to size and shape as shown in a slightly tapered mold.

In the construction as shown, the diameter and height of the specimen may vary from 2 to 5 centimeters. The upper or compression plate or platten 17 carries the foot or base 18 which is carried on the lower part of the rod, tube or plunger 19, said rod, tube or plunger having bearings in the brackets 20 and 21 of the stand 22, said brackets 20 and 21 and the stand 22 constituting a vertical guide.

The bracket 21 carries the set screw 23 which is used to hold the rod 19 in position during adjustment of the apparatus or positioning or removal of a specimen A.

The rod, tube or plunger 19 also carries the stylograph, pencil, marking device or stylus 24 having the marking point 25, the adjustment 26 and the light spring 27, which places the marking point 25 against the chart 14. To the top of the tube, rod or plunger 19 is connected the cup 28 which may receive the load, for example, consisting of any desired finely divided material, the particles of which may be controlled so that they will flow into the container with a uniform increment of weight per unit time during the period the experiment is being conducted.

It has been found most satisfactory for many purposes to use fine shot or metallic balls of various materials, such as lead shot of .060" in diameter for example.

In some cases sand and powdered materials may also be caused to flow gradually into the cup 28 of the load transmission device C.

The fine lead shot or other suitable material may be contained in the reservoir 29 and may flow from said reservoir into the tube 30 which may be vibrated by the electrical vibrator 31 to assure evenness of flow of the shot or other material down to the tube 30.

The gate valve device diagrammatically indicated at 32 may be opened at the beginning of the experiment after the specimen has been set in position and after the apparatus B and C has been set in proper initial position.

It is desirable that the weight upon the specimen A be reduced to a minimum at the beginning of the test and for this reason the plate 17, the foot 18, the tube 19 and the cup 28 may be made of light weight molded materials or even of light weight metals, such as aluminium or magnesium alloys, and if desired, a counterweight 38 may be included, as indicated in Fig. 2.

In the device of Fig. 2 there is shown the cup 28', to the sides of which are attached the hooks 33, to which is connected the cord 35 passing over the pulleys 36 and 37. The ring 39 is a retaining ring preventing the string 35 from being pulled off the pulleys 36 and 37 when the cup 28' is released from the hooks 33 to empty or dump it.

The counterweight 38 counter-balances the weight of the device 18'—19'—28' so that substantially no set will be applied to the specimen until a load is applied to the cup 28' through the conduit 30'.

In Fig. 3 the bucket or cup $28^2$, which is fed from the element $30^2$ corresponding to the tube 30 of Fig. 1, is suspended below the base $10^2$ so as to render the parts more accessible, correspondingly functioning parts being indicated by the same numerals provided with a superior 2.

As indicated in Fig. 3, there may be a rod or spider extending outwardly from the lower portion of the vertical rod $19^2$ upon which will be carried the suspension $35^2$ for carrying the cup or receiver $28^2$. The suspension structure $33^2$, $35^2$ and 50 is preferably so arranged as to hold the cup $28^2$ in balanced position, the structure being shown somewhat out of position in Fig. 3 for purposes of more compact illustration.

In both Figs. 2 and 3 the supply reservoir 29 may be positioned to the side and feed the cups 28' and $28^2$ through the troughs or conduits 30' or $30^2$.

In operation the sample of the plastic material, whether it be a grease, mortar, cement, solid emulsion or some other material, is first formed in a cylindrical mold which is slightly tapered.

The specimen may vary from 2 to 5 centimeters in diameter and height. After the specimen A has been placed upon the lower plate 16, the upper plate 17 is placed on top of the specimen and the set screw 23 is released so that the foot 18 will come down just upon the specimen. The plates 16 and 17 are flat so that the specimen will have uniform height over its entire cross section.

The chart 14 is properly adjusted in respect to the marking device B and then the vibrator is actuated. The shot is then made to flow by opening the valve 32 and the motor 11 is then started at the same time. The apparatus is permitted to operate for such a length of time until a suitable length of curve has been traced upon the chart 14. The experiment may not be continued beyond the point where the specimen squeezes past the periphery or edges of the plates 16 and 17. The specimen A must always be contained between the plates 16 and 17 in its entirety.

At the end of the experiment the valve 32 and the motor 11 are cut off simultaneously. During the operation, the pencil or stylograph B is pressed against the chart 14 to a predetermined extent by the adjustable spring 27 and will record a graph or curve from which the various calculations to determine plasticity may be made.

Since the rate of rotation and the rate of delivery of the lead shot is known, the record produced upon the chart 14 will indicate the relation between the load upon the specimen and the corresponding height of the specimen. From this relation, constants K and $p_0$ may then be readily reduced.

A typical curve which will be obtained is indicated in Fig. 4 in which the vertical axis 51 corresponds to values of $h$, the horizontal axis corresponds to values of the load which may be designated $g$, the line 53 represents the reference line where $h$ is equal to zero, the point 54 represents $h_0$, which is the height at the beginning of the experiment, the point 55 represents the point at which the deformation under added load commences.

The drop between points 54 and 55 represents the decrease in height due to the weight of the specimen and extraneous forces and loads which may be disregarded in making the calculations.

The writing device 25 moves in the direction indicated by the arrow 56.

When the values obtained are plotted logarithmically, the chart of Fig. 5 is obtained. The slope of the straight line 57 is equal to the constant K+1. The ordinates along the axis 58 represent log $h$, while the abscissae or values along the axis 59 represent values of the log $g$.

The distance 60 represents the log $g_0$ and it will be noted that this is equivalent to where the prelongation 61 of the line 57 cuts the horizontal line 62, which horizontal line corresponds to the point where the log $h$ equals the log $h_0$.

The deviation 61a corresponds to the drop 54—55 in the curve of Fig. 4 and is characteristic of all materials except those which have too much entrapped air. In the latter case the deviation 61b is the characteristic deviation.

Although the rate of loading has some effect upon these constants, this usually does not exceed a few per cent over a wide range of loading rates. In fact it is possible to vary the mode of loading considerably without substantially affecting the constants.

For example, it is possible to interrupt the loading and allow the specimen to come to rest to the height $h$ after each interruption. Or again, instead of interrupting the continuous loading, small weights may be cautiously added to the cup 28. However, these interrupted or intermittent loading procedures are less convenient and less accurate than the continuous loading procedures.

It will be noted that the load, rather than the pressure, is observed by the graph upon the sheet 14 and the load $g$, rather than the pressure $p$, is the variable quantity which is determined. To enable more ready calculation of the constants from the readings, the above formula may be transformed so that the load $g$ is included therein in lieu of pressure $p$.

When this is done, the following expression is obtained:

$$K+1 = \frac{\log g/g_0}{\log h_0/h}$$

The yield value $p_0$ is equal to $g_0$ divided by the initial area of the specimen.

It has been found that K, which may be regarded as the coefficient of renitence, is somewhat analogous to the coefficient of elasticity. It is independent of the amount of liquid which is present. It apparently is an inherent property of the material and is in fact an inverse measure of the plasticity of the product.

To quote typical cases it may be stated that plastic substances such as grease, cream, ball clay, lime possesses a value of K that is less than about 1. Vaseline with K equal to .4 is however more plastic than the nominally plastic cup grease with K equals to .8.

Poorly plastic materials possess a value of K which is appreciably greater than 1. A non-plastic kaolin may have K equal to 2.5, a masonry mortar 5, and a cement mortar 40.

It has been found for given materials, such as clay paste, lime putty, cement mortar, creams, fats and other plastic materials, that for most desirable plasticity K should at all times be within a certain range.

If for any reason, the tested value of K lies outside this range, then it is necessary to bring it back within this range by adjustment of the composition and nature of the solid or liquid phase or both.

For example, if a mortar has best spreading qualities as applied to bricks with K in the range of 5.0 to 7.0, then a mortar not having proper spreading properties may be adjusted, as for example by increasing the ratio of cement to sand and/or by adding waste sulphite liquor, tannin, stearates or other suitable additions to the mixture to decrease the value of K so that it falls between 5.0 and 7.0.

As another example, if vegetable shortening of desired plasticity has a value of K between 0.6 and 0.7, and if the tested value of K of a particular manufacturer's sample lies outside this range, then the conditions of hydrogenation may be altered to bring the value of K within the desired range.

Generally in case of materials having too little plasticity, the value of K will be too high, since the higher the value of K the higher the rigidity of the product under large stresses.

Where clay-like materials have too high a value of K, it may be possible to decrease this value of K by the addition of tannin or caustic soda or starch.

Where lime putty, for example, has too high a value of K, this may be decreased by changing the time of initial soaking or other conditions of manufacture.

Where grease has too high a value of K, it is possible to reduce such value by changing the soap or by changing the heating conditions during the manufacture thereof.

Workability is compounded of yield value and plasticity. By adding water or other liquid one may decrease indefinitely the yield value, but unless the plasticity is sufficiently high, proper workability will not be secured. Thus proper workability of a mortar that has too high a value of K, will not be obtained merely by adding water. It is necessary in fact to alter the value of K in the manner already discussed.

It is to be understood that the various specific elements and steps above mentioned have been mentioned by way of illustration and not by way of limitation, and that many alternatives, modifications and changes may be made in the above-identified procedures and apparatus specifically described without departing from the essential features of the present invention, all of which it is intended to cover broadly by the present invention.

What is claimed is:

1. In an apparatus for determining the plasticity of sample specimens, comprising a base including a platten to receive a specimen for test, a vertical guide disposed adjacent said platten, a plunger movable in said guide and including a platten member at its lower end for engagement with the specimen, a receptacle carried by the plunger to receive a load material, means for depositing load material in said receptacle at predetermined rate, and a recorder mechanism including relatively movable chart and stylus elements, one of said elements being fixed to move with the plunger in response to deformation of said specimen and the other element being movable in direct ratio to the rate of deposition of load material in said receptacle.

2. In an apparatus for determining the plasticity of sample specimens, comprising a base including a platten to receive a specimen for test, a vertical guide disposed adjacent said platten, a plunger movable in said guide and including a platten member at its lower end for engagement with the specimen, a receptacle carried by the plunger to receive a load material, means for depositing load material in said receptacle at predetermined rate, a recorder mechanism including relatively movable chart and stylus elements, one of said elements being fixed to move with the plunger in response to deformation of said specimen and the other element being movable in direct ratio to the rate of deposition of load material in said receptacle and a movable counterweight to counterbalance said receptacle and plunger.

PAUL S. ROLLER.